United States Patent
Meixner (10) Patent No.: US 9,758,036 B2
(45) Date of Patent: Sep. 12, 2017

(54) DRIVE DEVICE FOR ALL-WHEEL-DRIVE MOTOR VEHICLES

(71) Applicant: AUDI AG, Ingolstadt (DE)

(72) Inventor: Christian Meixner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 75 days.

(21) Appl. No.: 14/896,188

(22) PCT Filed: Jun. 5, 2014

(86) PCT No.: PCT/EP2014/001530
§ 371 (c)(1),
(2) Date: Dec. 4, 2015

(87) PCT Pub. No.: WO2014/195021
PCT Pub. Date: Dec. 11, 2014

(65) Prior Publication Data
US 2016/0121719 A1    May 5, 2016

(30) Foreign Application Priority Data
Jun. 7, 2013    (DE) .......................... 10 2013 009 540

(51) Int. Cl.
*B60K 17/342* (2006.01)
*B60K 17/348* (2006.01)
*F16H 7/02* (2006.01)

(52) U.S. Cl.
CPC .......... *B60K 17/348* (2013.01); *B60K 17/342* (2013.01); *F16H 7/023* (2013.01)

(58) Field of Classification Search
CPC .................................................. B60K 17/342
See application file for complete search history.

(56) References Cited

U.S. PATENT DOCUMENTS

| | | | |
|---|---|---|---|
| 2,754,691 A | 7/1956 | May | |
| 2,802,539 A | 8/1957 | Westfall | |
| 3,709,315 A | 1/1973 | Fisher | |
| 4,063,609 A | 12/1977 | Kincaid | |
| 4,407,381 A * | 10/1983 | Oswald | B60K 17/342 180/24.12 |

(Continued)

FOREIGN PATENT DOCUMENTS

| | | |
|---|---|---|
| CN | 1644421 A | 7/2005 |
| DE | 84 20 313.7 | 10/1984 |

(Continued)

OTHER PUBLICATIONS

International Search Report issued by the European Patent Office in International Application PCT/EP2014/001530.

(Continued)

*Primary Examiner* — Sherry Estremsky
(74) *Attorney, Agent, or Firm* — Henry M. Feiereisen LLC (57) ABSTRACT

A drive device for all-wheel-drive motor vehicles, includes a primary axle driven by a drive unit via an axle differential and a secondary axle driven via the left and right output elements of the axle differential and via transmitting means. The transmitting means are formed by at least two switching elements, which are arranged coaxial to the axle differential of the primary axle and which act on the left and right drive shaft of the secondary axle via belt or chain transmissions.

17 Claims, 7 Drawing Sheets

(56) References Cited

U.S. PATENT DOCUMENTS

| | | | | |
|---|---|---|---|---|
| 4,706,770 A | * | 11/1987 | Simon | B60K 17/20 180/24.02 |
| 5,337,849 A | | 8/1994 | Eavenson et al. | |
| 8,727,927 B2 | | 5/2014 | Meixner | |
| 2016/0138691 A1 | * | 5/2016 | Meixner | B60K 17/342 475/221 |

FOREIGN PATENT DOCUMENTS

| | | |
|---|---|---|
| DE | 20 2004 016 571 U1 | 1/2005 |
| DE | 20 2006 003 152 U1 | 2/2007 |
| DE | 20 2011 002 786 U1 | 7/2011 |
| EP | 1 508 466 A1 | 2/2005 |
| FR | 961585 | 5/1950 |
| FR | 1367891 A | 6/1964 |
| FR | 2 258 971 | 8/1975 |
| GB | 295820 | 8/1928 |
| GB | 878075 | 9/1961 |
| GB | 1161820 | 8/1969 |
| JP | H082292 A | 1/1996 |
| JP | 2005-035379 A | 2/2005 |
| JP | 2005035379 | 2/2005 |
| WO | WO 81/03150 | 11/1981 |
| WO | WO 93/05974 A1 | 4/1993 |
| WO | WO 94/14628 | 7/1994 |
| WO | WO 01/21430 A1 | 3/2001 |

OTHER PUBLICATIONS

Chinese Search Report issued by the Chinese Patent Office in Chinese Application No. 201480032046X dated Apr. 5, 2017.
English translation of Chinese Search Report issued by the Chinese Patent Office in Chinese Application No. 201480032046X dated Apr. 5, 2017.

* cited by examiner

DRIVE DEVICE FOR ALL-WHEEL-DRIVE MOTOR VEHICLES

CROSS-REFERENCES TO RELATED APPLICATIONS

This application is the U.S. National Stage of International Application No. PCT/EP2014/001530, filed Jun. 5, 2014, which designated the United States and has been published as International Publication No. WO 2014/195021 and which claims the priority of German Patent Application, Ser. No. 10 2013 009 540.9, filed Jun. 7, 2013, pursuant to 35 U.S.C. 119(a)-(d).

BACKGROUND OF THE INVENTION

The present invention relates to a drive device for all wheel drive motor vehicles.

All-wheel drives for motor vehicles, in particular passenger cars, can be roughly divided into permanent drives with two axle differentials and an intermediate axle differential (for avoiding drive tensions) and so called hang-on drives with a primary axle that is directly driven by the drive aggregate and a secondary axle that can be activated in the case of drive slip via a clutch (for example a viscous clutch or a Haldex clutch). The primary axle or secondary axle can hereby be the front axle or the rear axle of the motor vehicle.

JP 2005 035 379 A1 discloses a drive device in which the drive of the secondary axle of the motor vehicle is accomplished via a toothed belt drive as transmission means from the primary axle to the secondary axle. The differentials of the two axles are arranged in a conventional manner coaxial to the drive shafts that output to the wheels. Further a controllable clutch is provided via which the force flux to the secondary axle can be interrupted for achieving for example only a front drive of the motor vehicle.

From WO 81/03150 a generic drive device is known in which a secondary axle is impinged, via two lateral belt drives, by the primary axle of the motor vehicle or drive shafts of the primary axle that output on the wheels. Via the single axle differential only on the primary axle, however, rotational speed differences of the wheels, in particular when negotiating curves, cannot be compensated satisfactorily.

SUMMARY OF THE INVENTION

It is an object of the invention to set forth a drive device of the generic type, which has a compact design and which in particular offers greater constructive freedom regarding its arrangement in a motor vehicle and regarding driving dynamics.

This object is solved with a drive device for a four-wheel drive motor vehicle, including a primary axle driven by a drive aggregate via an axle differential; and a secondary axle having a left and a right drive shaft, wherein the secondary axle is driven via output elements of the axle differential and transmission means, wherein the transmission means is formed by at least two shifting elements arranged coaxial to the axle differential and acting on the left and a right drive shafts of the secondary axle via belt drives. Advantageous refinements and embodiments of the invention are set forth in the dependent claims.

According to the invention it is proposed that the transmission means are formed by at least two shifting elements, which are arranged coaxial to the axle differential of the primary axle and which act on the left and right drive shaft of the secondary axle via belt drives. This measure achieves generating a perfect rotational speed compensation and a variable drive torque distribution in particular when negotiating curves in case of a drive slip of the primary axle and in driving dynamics critical situations of the motor vehicle, at a compact construction. Furthermore the spatial arrangement of the drive aggregate and with this the weight distribution on the axles of the motor vehicle can be advantageously influenced via the configuration of the belt drives.

The term shifting element in this context is to be understood in a comprehensive sense and is intended to include any appropriate clutch device or any appropriate shifting device with which the function and effect according to the invention can be achieved. Preferably the shifting elements are configured as a clutch, in particular as a hang-on clutch, by means of which an axle can be drivingly connected (hung-on) to the drive device. The shifting elements assigned to the axle differential can for example by hydraulically controllable multi-disc clutches and/or can be configured so that they automatically engage or couple the secondary axle with the primary axle at defined rotational speed differences between the primary axle and the secondary axle.

The belt drives can be configured as chain drives or preferably as low-noise toothed belt drives. In the case of greater transmission distances, intermediate gears, deflection wheels etc. can be provided in the transmission housing for stabilizing an adjusting the belt drives to the given mounting space situation.

In addition, controllable shifting devices, in particular shifting clutches, can be integrated in the drive shafts that drive the wheels of the secondary axle, by means of which shifting devices the transmission means can be deactivated, when the shifting elements on the side of the primary axle are or are being disengaged. The shifting devices, which are preferably formed by clutches, can be hydraulically controllable multi-disc clutches or positive locking claw clutches or also synchronous clutches.

In a constructively and manufacturing-wise advantageous further embodiment of the invention, the shifting elements on the primary axle, which are preferably formed by two clutches, can be configured as a dual-clutch, whose two input elements that are situated on the dual clutch side, are drivingly connected with two outputting output elements of the axle differential, which is configured as planetary transmission, and whose two output elements on the side of the dual-clutch are connected to the input elements of the belt drives that are directly adjacent each other.

The axle differential of the primary axle can also be integrated into the drive aggregate as planetary transmission, wherein the shifting elements and the input elements of the belt drives are arranged coaxial to the drive shafts of the primary axle on a side of the drive aggregate. This configuration is in particular suited for motor vehicles with a drive aggregate that is mounted transversely in the front or rear of the motor vehicle, or in cases in which drive aggregates are mounted longitudinally and an axle differential is integrated between the driving internal combustion engine and the downstream variable speed transmission, to which axle differential then only the shifting elements and the input elements of the belt drives or the belt wheels of the toothed belt drive have to be mounted on one side.

As an alternative the preferably two shifting elements and the belt drives can be positioned on both sides of the axle differential and can output spatially separate from each other to the belt drives. In this case, instead of a planetary transmission as axle differential a bevel-gear differential can optionally be used. The shifting elements are also in this case formed preferably by clutches, in particular by two separate clutches.

Further in the case of motor vehicles with front-mounted or centrally mounted drive aggregate and rear primary axle it is proposed that the axle differential and the coaxial shifting elements are arranged in an axle housing of the primary axle and that the axle differential is driven via an output shaft of the drive aggregate (for example a cardanic shaft), wherein further the two belt drives are guided on both sides past the drive aggregate to the secondary axle. Correspondingly the secondary axle can be configured divided with a left hand and right hand side drive shaft and thus does not interfere with the arrangement of the drive aggregate optionally arranged there between. The axle housing of the primary axle can further be positioned relatively symmetrically or centered relative to the motor vehicle.

In an advantageous refinement of the invention, a respective step-up gear transmission can be assigned to the belt drives or toothed belt drives on the input side and a respective step-down gear transmission can be assigned to the belt drives or the toothed belt drives on the output side. This reduces the tensile load acting on the belt drives in a targeted manner, while at the same time adjusting the rotational speeds of the drive shafts of the secondary axle to at least substantially correspond to each other.

The gear transmissions can hereby preferably consist of planetary transmissions, which are arranged coaxial to the drive shafts of the primary axle and the secondary axle, and whose ring gears are configured fixed to the housing and whose input elements and output elements are formed by the planet carrier and the sun gear. Such planetary transmissions have a compact and robust design and good transmission efficiencies.

The transmission ratios of the gear transmissions at the primary axle and at the secondary axle can be configured so that when the motor vehicle drives straight ahead the drive shafts of the rear axle rotate slightly faster than the drive shafts of the front axle. In the case of the front axle as the primary axle of the motor vehicle this has the advantageous effect on driving dynamics that engagement of the shifting elements or activation of the secondary axle results in withdrawal of drive torque from the front wheel that runs along the outside of the curve and thus increases the transverse guiding force of this wheel.

Finally in an alternative embodiment of the invention, instead of clutches the gear transmissions, which are configured as planetary transmission, can be configured as shifting elements on the primary axle, with the planet carriers of the planetary transmission being driven via the output elements of the coaxial axle differential, its sun gears outputting to the drive elements of the belt drives and its ring gears can be arrested or released via brakes on the housing. The force flux to the secondary axle can thus be generated by arresting of the ring gears of the gear transmissions or can be interrupted to a higher or lower degree by releasing the brakes. The brakes can be preferably controlled hydraulically.

The invention also includes a method for operating a drive device with one or more of the features described above and/or set forth in the apparatus claims, wherein regarding the resulting advantages reference is made to the description above.

BRIEF DESCRIPTION OF THE DRAWING

In the following, multiple exemplary embodiments of the invention are explained in more detail by way of the included drawing or schematic diagrams. It is shown in.

DETAILED DESCRIPTION OF PREFERRED EMBODIMENTS

Figure 1:
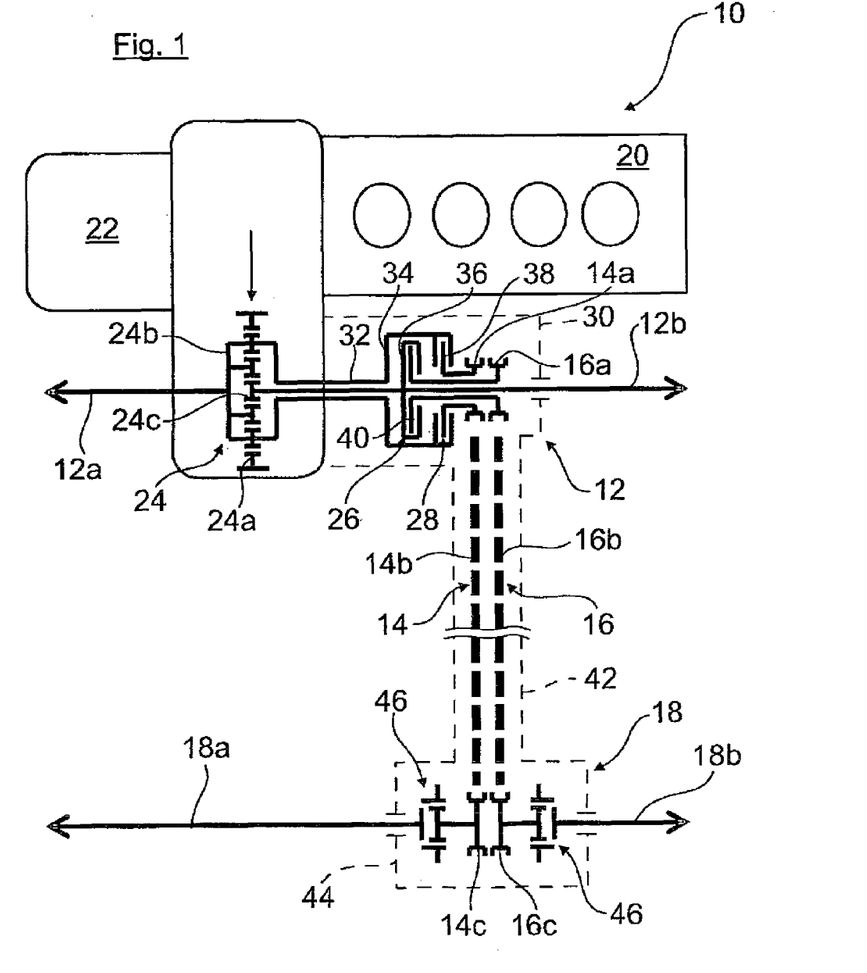
FIG. 1 a drive device for all wheel drive motor vehicles with a transversely mounted front drive aggregate with integrated axle differential of the primary axle and two hang-on clutches that are assemble to dual clutch, and which output to a rear secondary axle via toothed-belt drive.

FIG. 1 shows a very schematic representation of a drive device for a four-wheel-drive motor vehicle with a drive aggregate 10 transversely mounted at the front, which drives a front axle or primary axle 12 and via the primary axle, by means of transmission means or here exemplary two toothed-belt drive 14, 16, a rear axle or secondary axle 18 of the motor vehicle.

The drive aggregate 10 is essentially formed by an internal combustion engine 20 (this may also be another drive machine, for example an electric machine), a variable speed transmission 22 and an integrated planetary transmission axle-differential 24. The axle differential 24, as is known, drives the front wheels (not shown) of the primary axle 12 of the motor vehicle via drive shafts 12a, 12b. Hereby the ring gear 24a of the planetary transmission is driven as indicated with an arrow, while the output elements are the planet carrier 24b and the sun gear 24c, which are correspondingly connected with the drive shafts 12a and 12b.

Coaxially adjoining the drive aggregate 10 or the axle differential 24 are two hang-on clutches 26, 28 (for example Haldex clutches in the sense of including slip controlled multidisc clutches) which are assembled to form a dual clutch, and which are correspondingly supported in a housing 30 (indicated with dashed lines), which is flange-mounted to the axle differential 24, and are connected to the lube oil system of the axle differential.

The housing 34 of the clutch 28 is connected to the planet carrier 24b of the axle differential 24 via a hollow shaft 32, while the radially inner housing 36 of clutch 26 is connected with the sun gear 24*c* or with the drive shaft 24*b*.

The output elements 38, 40 of the dual clutch 26, 28 are drivingly connected with the axially adjacent belt wheels 14*a*, 16*a* of the toothed-belt drives 14, 16 via corresponding hollow shafts (not provided with reference numerals).

The toothed-belts 14*b* 16*b*, which extend from the belt wheels 14*a*, 16*a* and are guided in a housing 42, interact with the belt wheels 14*c*, 16*c*, which are supported in the axle housing 44 of the secondary axle 18. The belt wheels 14*c*, 16*c* herby output to the different-lengths drive shafts 18*a*, 18*b* or the rear wheels of the motor vehicle.

In the axle housing 44, clutches 46, for example jaw clutches 46, are arranged on the drive shafts 18*a*, 18*b* by means of which the drive shafts 18*a*, 18*b* can be decoupled individually or simultaneously from the toothed-belt drives 14, 16 via not shown shifting devices. Instead of jaw clutches, also synchronous clutches known from manual transmissions or hydraulically controllable multi-disc clutches can be used, to mention but a few further examples of such shifting devices.

During normal driving operation without difference in rotational speed of the wheels between the primary axle 12 and the secondary axle 18 of the motor vehicle, only the primary axle 12 is driven (in the exemplary embodiment front drive), while the secondary axle 18 runs along load-free or, in particular for energy saving reasons, is deactivated, i.e., by deactivating the toothed-belt drives 14, 16. For acceleration or for connecting the deactivated toothed-belt drives 14, 16, the clutches 26, 28 are engaged to a defined degree, preferably slightly, thereafter the shifting devices, here exemplarily formed by clutches 46, are engaged, for example in the case of equal rotational speeds, and only then the torque is transmitted to the secondary axle 18. This means that in the case of rotational speed differences between the primary axle 12 and the secondary axle 18 one of the hang-on clutches 26, 28 or both hang-on clutches 26, 28 engage depending on the driving situation, and depending on the clutch configuration more or less torque is redistributed via the toothed-belt drives 14, 16 to one or both of the rear wheels or to the drive shafts 18*a*, 18*b* of the secondary axle 18.

FIGS. 2 to 7 show alternative drive devices for motor vehicles. Functionally same parts are provided with the same reference numerals. For avoiding repetition only the relevant differences are described.

Figure 2:
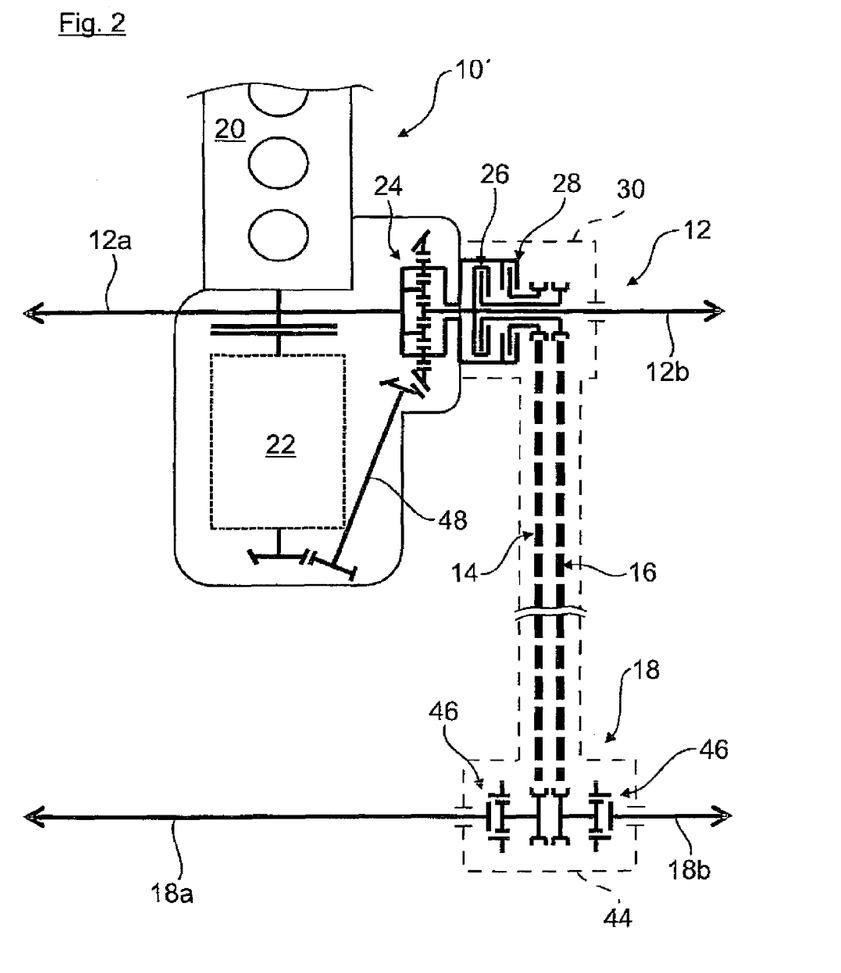
FIG. 2 a drive device in which the drive aggregate is mounted longitudinally, with hang-on clutches, which are constructed as dual clutches, and are mounted laterally to the integrated axle differential of the primary axle, which hang-on clutches in turn drive the rear secondary axle via lateral toothed-belt drive.

In the exemplary embodiment of FIG. 2 the drive aggregate 10' with internal combustion engine 20 and a variable speed transmission 22, is longitudinally mounted in the motor vehicle and is arranged at the front. The planetary transmission axle-differential 24, which is integrated into the drive aggregate 10', is positioned laterally and, as is known, is driven via an output shaft 48 of the variable speed transmission 22.

As described above, the axle differential 24 outputs to the drive shafts 12*a*, 12*b* of the primary axle 12 or to the dual clutch 26, 28 mounted on one side, and the dual clutch to the toothed-belt drives 14, 16. The toothed-belt drives 14, 16 in turn act, as described above, on the rear axle or the secondary axle 18 of the motor vehicle.

Figure 3:
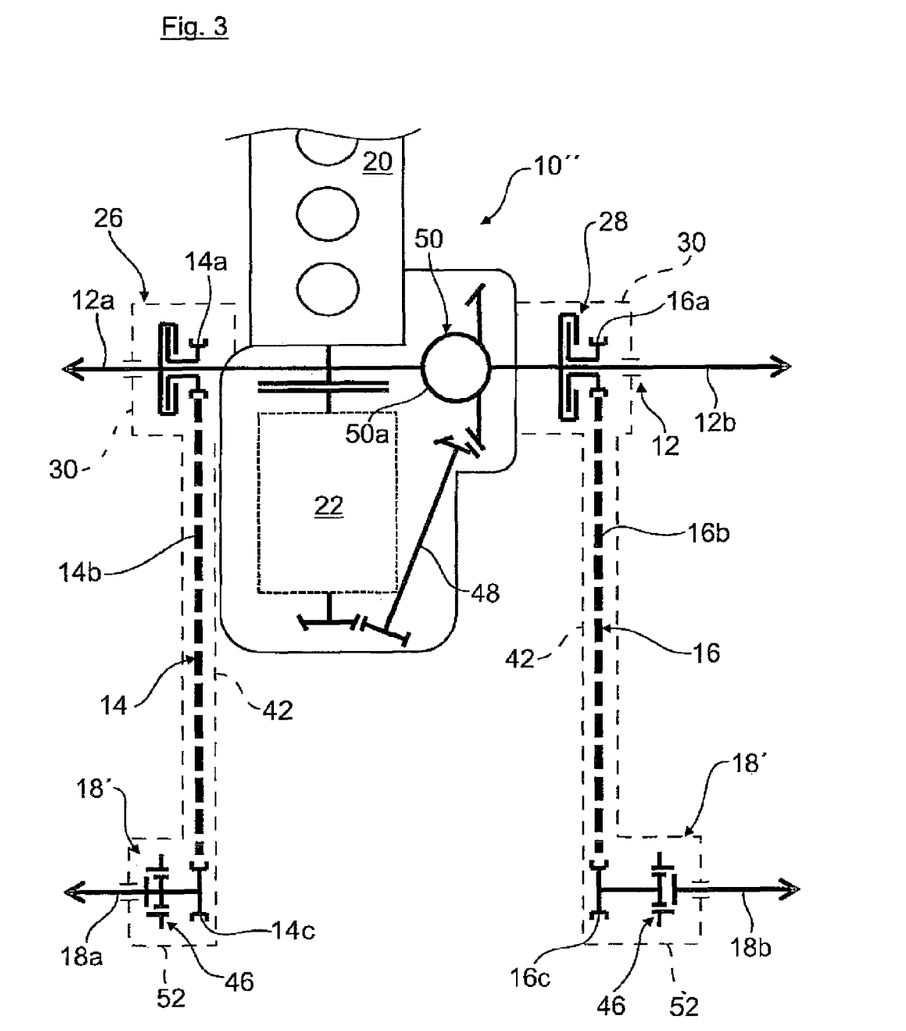
FIG. 3 a drive device alternative to FIG. 2, with two separate hang-on clutches which are arranged on both sides of the longitudinally mounted drive aggregate, and which output to the rear two-part secondary axle.

FIG. 3 shows a drive device alternative to the one of FIG. 2 on the longitudinally mounted drive aggregate 10", in which the separate hang-on clutches 26, 28 are arranged coaxial on both sides of the drive aggregate 10" on the primary axle 12 and are coupled to the drive shafts 12*a*, 12*b*.

Hereby the axle differential 50 integrated into the drive aggregate 10" is configured as bevel-gear differential, which is driven via the output shaft 48 and which, as is known, outputs to the drive shafts 12*a*, 12*b* via the bevel gears (not shown) integrated in its differential case 50*a*.

As described above, the hang-on clutches 26, 28 act on the toothed-belt drives 16, 16 arranged on both side of the drive aggregate 10" and the toothed-belt drives on the drive shafts 18*a*, 18*b* of the two-part secondary axle 18' with separate axle housings 52.

Figure 4:
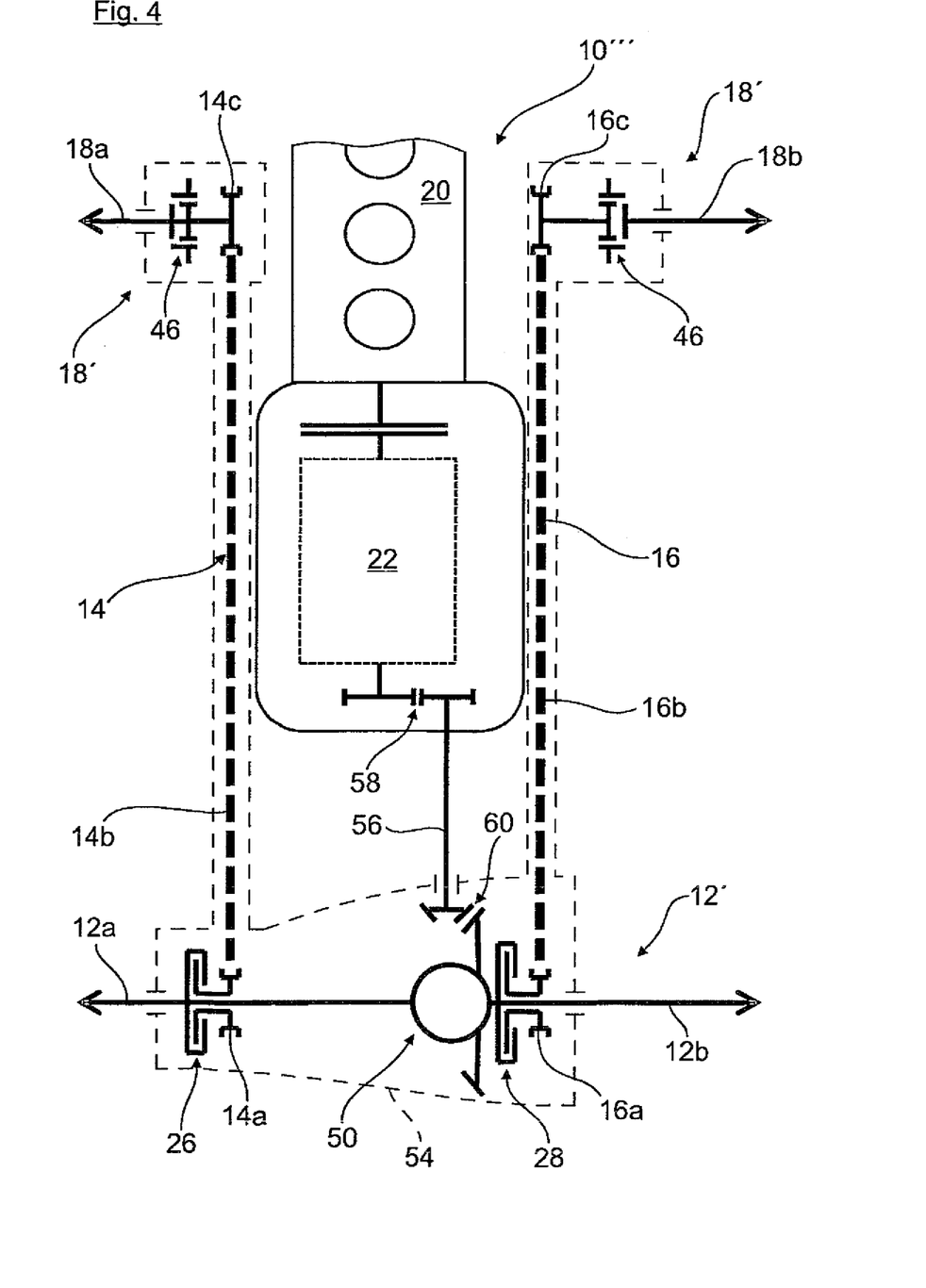
FIG. 4 a further drive device with rear primary axle, whose axle differential is driven via the longitudinally installed drive aggregate and which is drivingly connected with the front two-part secondary axle via two separate hang-on clutches and toothed-belt drive arranged on either side.

The exemplary embodiment of the invention according to FIG. 4 represents a further alternative drive device for a motor vehicle, also with longitudinally mounted drive aggregate 10'''.

Hereby the drive aggregate 10''' with internal combustion engine 20 and a variable speed transmission 22 is arranged at the front of the motor vehicle and the rear axle forms the primary axle 12', while the front axle represents the two-part secondary axle 18' which is driven by the primary axle 12'.

In the axle housing 54 of the primary axle 12' the bevel-gear differential 50 and on both sides the separate hang-on clutches 26, 28 are arranged and are substantially configured as described for FIG. 32.

The axle differential 50 is, however, driven via an output shaft 56 (for example a cardanic shaft) of the variable speed transmission 22, which output shaft 56 is oriented in longitudinal direction of the vehicle and is arranged axially parallel and laterally offset via a spur gear drive 58 and outputs to the axle differential 50 via the bevel gear drive 60.

As can be seen the drive shaft 12*a* of the axle differential 50, which drives the left rear wheel of the motor vehicle, is guided through the clutch 26 and the belt wheel 14*a* and the right hand drive shaft 12*b* are guided through the clutch 28 and the belt wheel 16*a*.

The housings of the clutches 26, 28 are drivingly connected with the drive shafts 12*a*, 12*b* of the axle differential 50, while their output elements act on the belt wheels 14*a*, 16*a* of the toothed-belt drives 14, 16, which are laterally guided past the drive aggregate 10'''. Via the toothed belts 14*b*, 16*b* with the belt wheels 14*c*, 16*c* on the front drive shafts 18*a*, 18*b* the secondary axle 18 is driven with the clutches 46 integrated in the drive shafts 18*a*, 18*b*.

The function of the drive device according to FIG. 4 is essentially the same as the drive device according to FIG. 3, with the difference that the two separate hang-on clutches 26, 18 are arranged on both sides of the axle differential 50 and inside a common axle housing 54, which is separate from the drive aggregate 10''', and that as a result of the two-part configuration of the front-side positioned secondary axle 18' the position of the drive aggregate 10''' can be selected relatively freely and can for example be configured as front aggregate or can be arranged centered.

Figure 5:
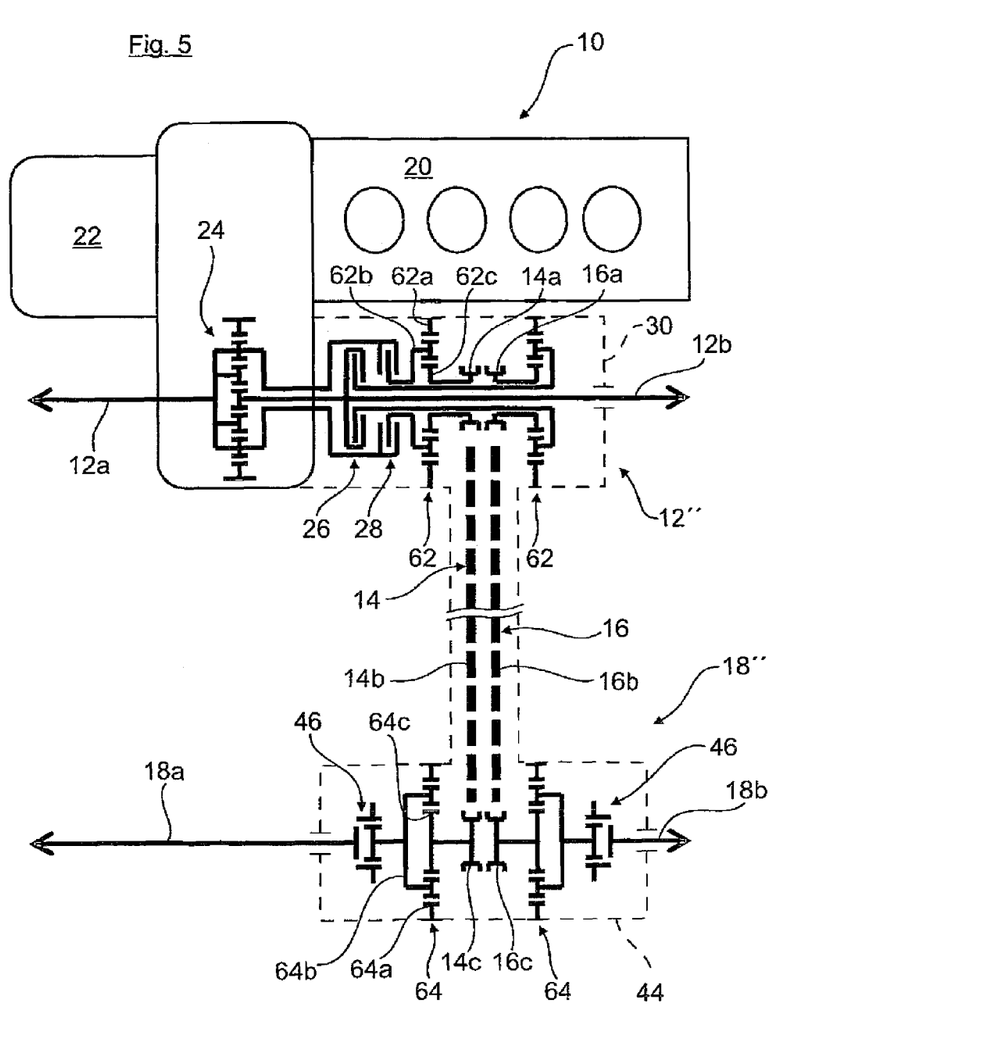
FIG. 5 a drive device alternative to FIG. 1 with transversely mounted drive aggregate and with gear transmissions, which on the output side are integrated between the dual clutch and the toothed-belt drive.
Figure 6:
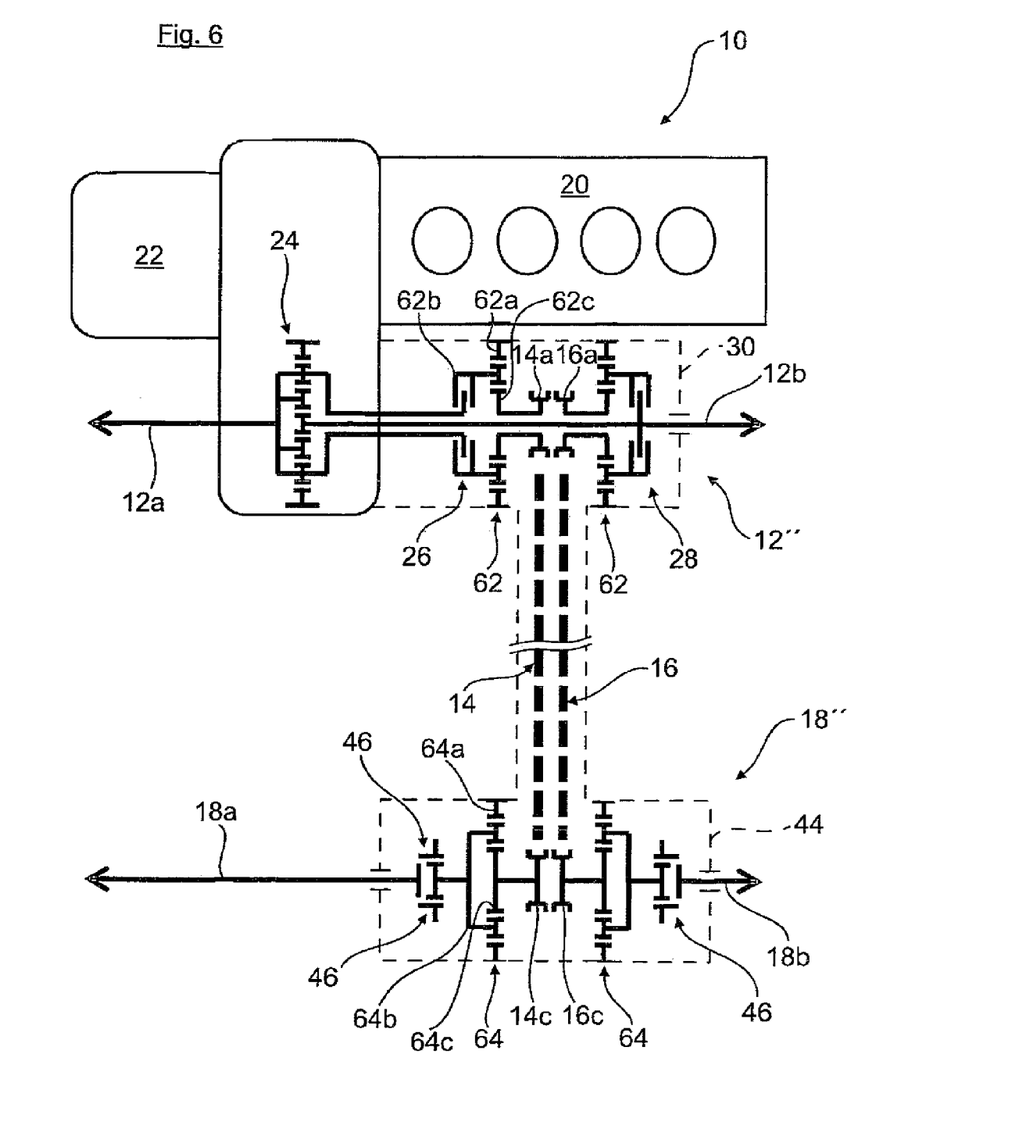
FIG. 6 the drive device according to FIG. 5 with separate hang-on clutches arranged on both sides of the gear transmissions.

FIGS. 5 and 6 show a drive device, modified compared to FIG. 1, with the drive aggregate 10 mounted transversely in the front (or in the rear). In FIG. 6 the hang-on clutches 26, 28 of the primary axle 12", which are arranged coaxial relative to the planetary axle differential integrated in the variable speed transmission 22, are configured separate from each other and are positioned on both sides of the driving belt wheels 14*a*, 16*a* of the toothed-belt drives 14, 16, while in FIG. 5 the hang-on clutches 26, 28 are configured as in FIG. 1 as a dual clutch and are arranged directly adjacent each other.

Respectively in force flux after the clutches 26, 28, identically constructed gear transmissions 62 configured as planetary transmission are provided, which effect a step-up ratio or a torque or traction force reduction on the belt wheels 14*b*, 16*b* to the downstream arranged belt wheels 14*a*, 16*a*.

Hereby the ring gears 62a of the gear transmissions 62 are respectively fixed to the housing, while the planet carriers 62b that carry the planetary gears (without reference numeral) are coupled with the output elements of the clutches 26, 28; the sun gears 62c of the gear transmissions 62 are coupled to the belt wheels 14a, 16a of the toothed-belt drives 14, 16.

The secondary axle 18" differs from the secondary axle 18 according to FIG. 1 in that gear transmissions 64, which are also constructed identical and as planetary transmissions, are used which are arranged in force flux between the belt wheels 14c, 16c and the drive shafts 18a, 18b, which have the shifting clutches 46 and which form a step-down ratio such that the drive shafts 12a, 12b of the primary axle 12" and the drive shafts 18a, 18b of the secondary axle 18" have corresponding rotational speeds again (in the case of normal straight ahead drive of the motor vehicle).

For this the ring gears 64a of the gear transmissions 64 are again housing fixed while the sun gears 64c which are coupled with the belt wheels 14c, 16c form the drive elements and the planetary gears carrying webs 64b which are drivingly connected with the drive shafts 18a, 18b are the output elements of the gear transmissions 64.

The function of the drive device with the primary axle 12", the two hang-On clutches 26, 28 the toothed-belt drives 14, 16 and the secondary axle 18" is the same as described with regard to FIG. 1, wherein as a result of the intermission of the gear transmissions 62, 64 the stress on the toothed-belt drives 14, 16 is reduced and the latter correspondingly either transmit higher drive torques to the secondary axle 18" or can be configured for lower loads.

The transmission ratios of the gear transmissions 62, 64 on the primary axle 12" and on the secondary axle 18" can be configured so that in case of normal straight ahead drive of the motor vehicle the drive shafts 18a, 18b of the rear secondary axle 18" rotate slightly faster than the drive shafts 12a, 12b of the front primary axle 12" of the motor vehicle. In the case of a front axle as the primary axle 12" of the motor vehicle this has the advantageous effect on driving dynamics that when driving through curves engagement of the shifting elements or activation of the secondary axle 18" results in withdrawal of drive torque from the front wheel that runs along the outside of the curve (for example the drive shaft 12a) and thus increases the transverse guiding force of this wheel.

Figure 7:
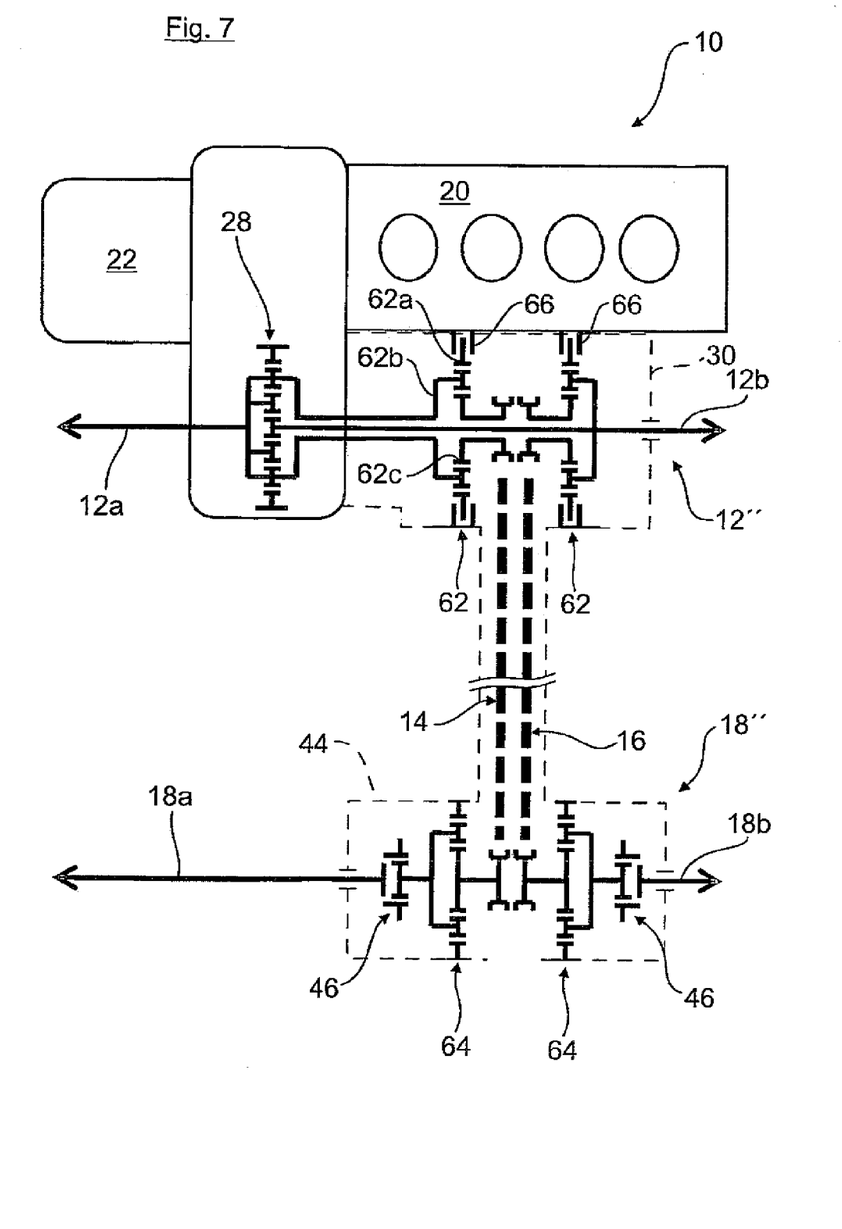
FIG. 7 a drive device alternative to the above Figures on a transversely mounted drive aggregate whose axle differential outputs to the toothed-belt drive via gear transmissions configured as planetary transmissions, wherein the force flux is controllable by means of integrated shifting elements or by means of brakes.

FIG. 7 finally shows an exemplary embodiment of the invention based on FIG. 6 in which clutches or the hang-on clutches 26, 28 are not included but rather corresponding shifting elements are provided in the gear transmissions 62 on the primary axle 12''', which serve for the controlled coupling of the secondary axle 18" to the primary axle 12'''.

The shifting elements are formed by brakes 66 arranged on the ring gears 62a of the gear transmission 62. The brakes 66 can in a manner known per se be multi disc brakes which in the engage state transmit the force flux from the directly driving webs 62b to the outputting sun gears 62c.

When the brakes 66 are disengaged the gear transmission 62, the toothed-belt drives 14, 16 and the gear transmission 46 can rotate along load-free. When additionally shifting devices, here exemplary formed by clutches 46, in particular by jaw clutches, are opened the belt drives, which are here exemplarily formed by toothed-belt drives 14, 16, can be deactivated.

The coupling of the secondary axle 18" to the primary axle 12" on the left side, the right side or on both sides can preferably be accomplished hydraulically by corresponding impingement of the brakes 66 depending on the drive slip on the wheels of the primary axle 12''' and/or depending on drive specific parameters such as vehicle speed, steering angle of the front wheels etc.

The invention is not limited to the shown exemplary embodiments. In particular the person with skill in the art may perform common modifications between the FIGS. 1 to 7.

The clutches 26, 28, which can be arranged as a dual clutch or separate from each either, can for example be configured as hydraulically controlled or slip controlled multi-disc clutches for transmitting the drive torques to the secondary axle 18.

Depending on the vehicle-specific arrangement of the drive aggregate 10 at the rear, front or centered, the secondary axle 18 can be used as front axle or as rear axle. The primary axle 12 can be mounted to the drive aggregate 10 or can be configured as separate front or rear axle (FIG. 4).

The invention claimed is:

1. A drive device for a four-wheel drive motor vehicle, comprising:
a primary axle driven by a drive aggregate via an axle differential; and
a secondary axle having a left and a right drive shaft, said secondary axle being driven via output elements of the axle differential and by at least two shifting elements arranged coaxial to the axle differential and acting on the left and a right drive shafts of the secondary axle via belt drives.

2. The drive device of claim 1, wherein the shifting elements are formed by clutches.

3. The drive device of claim 2, wherein the clutches close in response to rotational speed differences between wheels of the four-wheel drive motor vehicle.

4. The drive device of claim 2, wherein the belt drives are one-part or multipart belt drives.

5. The drive device of claim 2, further comprising controllable shifting devices integrated in drive shafts that drive wheels of the secondary axle.

6. The drive device of claim 5, wherein the shifting devices are configured for deactivation of the belt drives when the clutches are in a disengaged state.

7. The drive device of claim 5, wherein the controllable shifting devices are constructed as clutches.

8. The drive device of claim 1, wherein the at least two shifting elements are formed by two clutches that form a dual-clutch having two input elements and two output elements, said two input elements being drivingly connected with two of the output elements of the axle differential, said two output elements of the dual-clutch being connected to the belt drives, said belt drives being arranged directly adjacent each other, said axle differential being configured as a planetary transmission.

9. The drive device of claim 1, wherein the axle differential of the primary axle is integrated in the drive aggregate and is configured as a planetary transmission, and wherein the shifting elements and input elements of the belt drives are arranged coaxial to drive shafts of the primary axle on a side of the drive aggregate.

10. The drive device of claim 1, wherein the axle differential is configured as a bevel-gear differential and wherein the shifting elements and the belt drives are positioned on two respective sides of the axle differential.

11. The drive device of claim 10, wherein the shifting elements are formed by two clutches.

12. The drive device of claim 1, wherein the axle differential and the shifting elements are arranged in an axle housing of the primary axle, wherein the axle differential is driven via an output shaft of the drive aggregate, and wherein the two belt drives are guided on both sides past the drive aggregate to the secondary axle.

13. The drive device of claim 1, further comprising a respective step-up gear transmission assigned to the belt drives on an input side of the drive aggregate and on an output side of the drive aggregate, and a respective step-down gear transmission is assigned to the belt drives.

14. The drive device of claim 13, wherein the gear transmissions are constructed as planetary transmissions arranged coaxial to drive shafts of the primary axle and to the drive shafts of the secondary axle, with ring gears of the planetary transmissions being fixed to a housing of the planetary transmission and with input elements and output elements of the planetary transmission being formed by a planet carrier and a sun gear of the planetary transmission.

15. The drive device of claim 13, wherein transmission ratios of the step-up gear transmissions and the step-down gear transmissions at the primary axle and the secondary axle are configured so that when the motor vehicle drives straight ahead the drive shafts of a rear axle of the motor vehicle rotate faster than the drive shafts of a front axle of the motor vehicle by a defined degree.

16. The drive device of claim 1, wherein the at least two shifting elements which output to the belt drives are formed by gear transmission constructed as planetary transmissions on the primary axle, with planet carriers of the planetary transmissions being driven via the output elements of the axle differential, with sun gears of the planetary transmissions outputting to the input elements of the belt drives, said drive device further comprising brakes on a housing of the planetary transmission, said brakes being configured for arresting ring gears of the planetary transmissions.

17. A method for operating a drive device for a four-wheel-drive motor vehicle, comprising:
    driving a primary axle with a drive aggregate via an axle differential; and
    driving a secondary axle having a left and a right drive shaft, via output elements of the axle differential and by at least two shifting elements arranged coaxial to the axle differential and acting on the left and a right drive shafts of the secondary axle via belt drives.

* * * * *